United States Patent
Marra et al.

(10) Patent No.: US 10,037,310 B1
(45) Date of Patent: Jul. 31, 2018

(54) EVALUATING CONTENT IN A COMPUTER NETWORKED ENVIRONMENT

(75) Inventors: Gregory Matthew Marra, San Francisco, CA (US); Frances Bordwell Haugen, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 1631 days.

(21) Appl. No.: 13/572,574

(22) Filed: Aug. 10, 2012

(51) Int. Cl.
*G06F 17/00* (2006.01)
*G06F 17/22* (2006.01)
*G06F 17/30* (2006.01)

(52) U.S. Cl.
CPC .... *G06F 17/2235* (2013.01); *G06F 17/30241* (2013.01)

(58) Field of Classification Search
CPC ........................ G06F 17/30241; G06F 17/2235
USPC ................................. 715/205, 234, 200, 208
See application file for complete search history.

(56) References Cited

U.S. PATENT DOCUMENTS

| | | | | |
|---|---|---|---|---|
| 7,299,457 B2* | 11/2007 | Marshall | ........... | G06F 17/30873 707/E17.111 |
| 7,801,950 B2* | 9/2010 | Eisenstadt | ........... | G06F 17/3089 707/E17.11 |
| 8,875,023 B2* | 10/2014 | Cronin | ................ | G06F 3/04847 715/716 |
| 9,176,643 B2* | 11/2015 | Elia | ........................ | G06F 3/0482 |
| 9,418,374 B2* | 8/2016 | Hubbard | ................ | G06Q 30/02 |
| 2009/0099904 A1* | 4/2009 | Affeld et al. | ........... | G06Q 30/02 705/14.43 |
| 2010/0269144 A1 | 10/2010 | Forsman et al. | | |
| 2010/0332497 A1 | 12/2010 | Valliani et al. | | |
| 2011/0022602 A1 | 1/2011 | Luo et al. | | |
| 2012/0110474 A1* | 5/2012 | Chen | ...................... | G06Q 10/10 715/753 |
| 2012/0221563 A1* | 8/2012 | De | ................... | G06Q 10/06311 707/728 |
| 2012/0265635 A1* | 10/2012 | Forsblom | ............... | G06Q 50/01 705/26.7 |

(Continued)

FOREIGN PATENT DOCUMENTS

WO   WO-2009/085831 A1   7/2009

OTHER PUBLICATIONS

Spanner Spencer, Changing the Thumbnail When Sharing a Link on Facebook, Published Jun. 23, 2012, smallbusiness.com, p. 1.*

(Continued)

*Primary Examiner* — Manglesh M Patel
(74) *Attorney, Agent, or Firm* — McDermott Will & Emery LLP (57) ABSTRACT

Systems and methods of evaluating content in a computer networked environment are provided. The data processing system can provide a first link to content for display on a first web page and a second link to the content for display on a second web page. The first and second links have first and second thumbnails associated with the content, respectively. The system determines at least one of a first number of views and a first number of conversions of the first link and at least one of a second number of views and a second number of conversions of the second link. The system can determine a quality metric of the first thumbnail and a quality metric of the second thumbnail, and can select one of the first thumbnail and the second thumbnail for display on a web page based on the quality metrics.

20 Claims, 4 Drawing Sheets

(56) References Cited

U.S. PATENT DOCUMENTS

2015/0153910 A1* 6/2015 Wheeler ............... G06F 3/0482
715/719

OTHER PUBLICATIONS

Kristi Hines, 9 Awesome Things You Can Do With Google Analytics 5, published Aug. 5, 2012 on wayback machine, pp. 1-7 (pdf).*
Eugen Oprea, How to Track Social Media Traffic With Google Analytics, published Apr. 2, 2012, Socialmediaexaminer.com, pp. 1-15 (pdf).*
Brian Honigman, 8 Ways to Track Youtube Video Performance, published May 31, 2012, Socialmediaexaminer.com. pp. 1-15 (pdf).*
Le Hoang, Picasa: Use Google Analytics to Track Photo Views, published May 14, 2011, tech-recipes.com, pp. 1-6 (pdf).*
Anna Lewis, How to Track Clicks on a Link in Google Analytics, published Aug. 6, 2012 on wayback machine, pp. 1-7.*

* cited by examiner

EVALUATING CONTENT IN A COMPUTER NETWORKED ENVIRONMENT

TECHNICAL FIELD

This disclosure relates to the field of computer networked environments. In particular, this disclosure relates to evaluating content in a computer networked environment.

BACKGROUND

In a networked environment such as the Internet, websites can provide a link to a video or other subject matter. By clicking on the link, a user can access the video and the video can be displayed on a user device. Many different web pages can provide links to the same video or other content, allowing the content to proliferate through a computer network for viewing by a large number of users.

SUMMARY

At least one aspect is directed to a computer implemented method of evaluating content in a computer networked environment. The method provides a first link to content for display on a social networking website. The first link has a first thumbnail associated with the content. The method provides a second link to the content for display on the social networking website. The second link has a second thumbnail associated with the content. The method determines at least one of a first number of views and a first number of conversions of the first link and determines at least one of a second number of views and a second number of conversions of the second link. The method determines a quality metric of the first thumbnail based on at least one of the first number of views and the first number of conversions of the first link and determines a quality metric of the second thumbnail based on at least one of the second number of views and the second number of conversions of the second link. The method selects one of the first thumbnail and the second thumbnail based on the quality metric of the first thumbnail and the quality metric of the second thumbnail.

At least one aspect is directed to a system of evaluating content in a computer networked environment. The system includes a data processing system having at least one of a thumbnail selection module and a quality metric module. The data processing system can provide a first link to content for display on a website. The first link has a first thumbnail associated with the content. The system can provide a second link to the content for display on the website. The second link has a second thumbnail associated with the content. The system determines at least one of a first number of views and a first number of conversions of the first link and determines at least one of a second number of views and a second number of conversions of the second link. The system determines a quality metric of the first thumbnail based on at least one of the first number of views and the first number of conversions of the first link and determines a quality metric of the second thumbnail based on at least one of the second number of views and the second number of conversions of the second link. The system selects one of the first thumbnail and the second thumbnail based on the quality metric of the first thumbnail and the quality metric of the second thumbnail.

At least one aspect is directed to a computer readable storage medium having instructions to evaluate content in a computer networked environment. The instructions include instructions to provide a first link to content for display on a website. The first link has a first thumbnail indicating the content. The instructions include instructions to provide a second link to the content for display on the website. The second link has a second thumbnail indicating the content. The instructions include instructions to determine at least one of a first number of views and a first number of conversions of the first link and to determine at least one of a second number of views and a second number of conversions of the second link. The instructions also include instructions to determine a quality metric of the first thumbnail based on at least one of the first number of views and the first number of conversions of the first link and to determine a quality metric of the second thumbnail based on at least one of the second number of views and the second number of conversions of the second link. The instructions include instructions to select one of the first thumbnail and the second thumbnail based on the quality metric of the first thumbnail and the quality metric of the second thumbnail.

These and other aspects and embodiments are discussed in detail below. The foregoing information and the following detailed description include illustrative examples of various aspects and embodiments, and provide an overview or framework for understanding the nature and character of the claimed aspects and embodiments. The drawings provide illustration and a further understanding of the various aspects and embodiments, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Following below are more detailed descriptions of various concepts related to, and embodiments of, methods, apparatuses, and systems for evaluating content in a computer networked environment. The various concepts introduced above and discussed in greater detail below may be implemented in any of numerous ways, as the described concepts are not limited to any particular manner of implementation. Examples of specific implementations and applications are provided primarily for illustrative purposes.

In a networked environment such as the Internet, video sharing websites can provide a link to a video including an image (e.g., thumbnail) of the video. The thumbnail can be a frame of the video, for example. By clicking on the link, which can include (or be presented concurrently with) the thumbnail, a user can access the video. The thumbnail that is displayed can indicate the content of the video. A more appealing or informative thumbnail can increase user interest in the video and increase the likelihood that the user will view the video, when compared, for example, to an ambiguous or uninformative thumbnail. Thus, the thumbnail that appears with a link to the video can affect the number of times that the video is viewed.

In some implementations, a data processing system provides links with corresponding thumbnails for display on web pages, such as web pages of a social network. The thumbnail can represent content such as a video, image, graphic, or text of a web page or other networked document. Different thumbnails can represent the same content. For example, thumbnails can display different frames of the same video. The various thumbnails can be clicked on at different rates to access the video or other underlying content. The data processing system can determine the click-through rate (or other quality metric) of the various links and attribute these rates at least in part to the quality of the thumbnail corresponding to the link. The data processing system can determine that one (or more) of the thumbnails is associated with more clicks, (e.g. a higher quality thumbnail,) and can select that thumbnail for future renderings of the link on one or more web pages.

For example, the data processing system (e.g., at least one server) can provide, on a first web page, a first link to a video for display at a user device. The first link can include a first thumbnail, such as an image frame of the video. The data processing system can also provide, on a second web page, a second link to the same video for display. The second link can include a second thumbnail of the same video for display at a different social networking web page. In this example, the first thumbnail is displayed on the first web page, and the second thumbnail is displayed on the second web page having the same or a different website address (e.g., URL) than the first web page. The data processing system can track the performance of the thumbnails on the different web pages to identify a better performing thumbnail. For example, the thumbnail having the highest click through rate (or other quality metric) can be selected as the best performing thumbnail. With the best performing thumbnail identified, the data processing system then provide links to the content together with the best performing thumbnail.

This example, where different thumbnails representing the same content are provided on different web pages, may be employed when there are a relatively large number of users sharing the content on their respective social networking web pages. For example, thousands of social network users may be independently sharing a link to a video for a popular song. The data processing system can identify a statistically significant number of views or clicks corresponding to the thumbnails (e.g., more than 1000) to determine quality metrics (e.g., number of unique viewers, number of unique conversions, click through rate or click through volume) of the thumbnails. For example, the data processing system can select the thumbnail that generates more clicks, or more clicks per unit number of views or impressions, such as clicks per thousand impressions. In one implementation, the data processing system compares the click-through rate of the first thumbnail with the click through rate of the second thumbnail. The higher click through rate can be attributed to the better thumbnail. Once selected by the data processing system, future links to the content can be provided with the better performing thumbnail.

In some implementations, the data processing system provides links to content for different impressions of the same web page. For example, a user of a social network can post a link to content on his or her social network web page. Other users visiting the social network web page can view the link. In this example, different thumbnails can be displayed with the link to different users viewing the same social network web page. For example, a first person may see one thumbnail on a friends social network web page, and a second person independently viewing the same social network web page may see another, different thumbnail representing the same content. In this example, the data processing system can identify impressions of the different thumbnails on the same web page, determine quality metrics for the different thumbnails, and select the thumbnail having best quality metric.

This example, where different thumbnails representing the same content are provided on different impressions of the same web page, may be employed when there are a relatively small number of users sharing the content on their respective social networking web pages. For example, a parent may be sharing the video of their child's first steps, with a relatively small number of other social network users being likely to post a link to this same video. The data processing system can identify a number of views or clicks corresponding to the different thumbnails provided for different impressions of the same web page to determine quality metrics (e.g., click through rate or click through volume) of the thumbnails. The data processing system can select the thumbnail having the best quality metric for that content. Once selected, future links to that content (displayed on the parent's web page or another web page of the social network) can be displayed with the selected thumbnail.

In another implementation, a link to a video can be shared (e.g., from a source web page such as a web page of a video sharing website) by posting a link having a thumbnail to the video on a web page of a social network. The thumbnail in this example can be provided with a key or other identifier that can identify the thumbnail used with the post of the video. For example, the identifier can indicate which frame of a video is used as a thumbnail. When a user clicks on the thumbnail on the social network web page, the data processing system can identify (e.g., from the identifier) which thumbnail was provided for display to the user. This implementation may be employed when the social networking website and the source content provider are not affiliated. In this manner, the data processing system can determine the click through volume (e.g., the number of views of the web page per thumbnail) or other quality metric to identify the best performing thumbnail. The data processing system can select the best performing thumbnail, and once selected, future links to that content (for example on a web page of the social network) can be displayed with the selected thumbnail.

Figure 1:
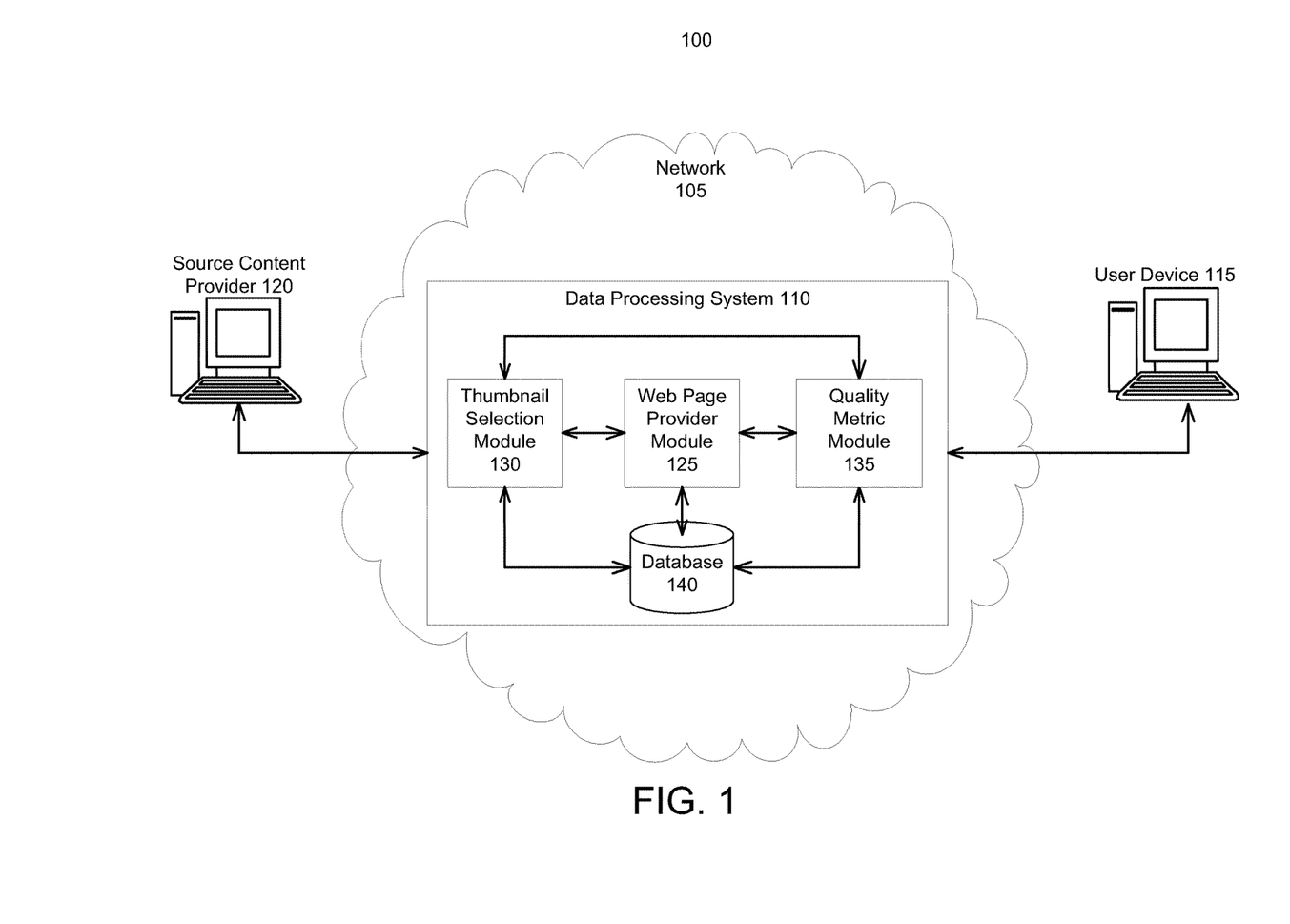
FIG. 1 is a block diagram depicting an example environment of evaluating content in a computer networked environment, according to an illustrative implementation.

FIG. 1 illustrates an example system 100 of evaluating content in a computer networked environment, via at least one computer network such as network 105. The network 105 can include computer networks such as the Internet, local, metro, or wide area networks, intranets, satellite networks, or other communication networks such as voice or data mobile phone networks. The system 100 includes at least one data processing system 110. The data processing system 110 can include at least one processor or other logic device to communicate via the network 105 with at least one user device 115 (e.g., a laptop, desktop, tablet, personal digital assistant, smart phone, or portable computer), and at least one source content provider 120. The data processing system 110 can also include at least one web page provider module 125, at least one thumbnail selection module 130, at least one quality metric module 135, and at least one database 140.

The data processing system 110 can include at least one server configured to host web pages associated with a social network. In one implementation, the data processing system 110 includes servers configured to provide web pages to the user device 115 via the network 105. The source content provider 120 may provide content that is accessible via a link on a web page provided by the data processing system 110. For example, the source content provider 120 can provide video for display on web pages. The source content provider 120 may include at least one server associated with a website that hosts videos. The content can include video, audio, multimedia, image, text, or graphical content, as well as combinations thereof.

The data processing system 110 can receive, for example, from a user of a user device 115, a request to access a web page via the network 105. Responsive to this request, the data processing system 110 can provide the web page for display at the user device 115 together with a link to the content. The link may include a thumbnail that represents the content. The thumbnail may be a computer graphic that can be hyperlinked to navigate the user device to a different location within the same web page or to another web page. The thumbnail may be a still image, video segment, or a dynamic image including a plurality of image frames that appear sequentially. In one implementation, the thumbnail corresponds to an image frame of a video.

The thumbnail selection module 130 can include at least one processor or logic device to select a thumbnail associated with the content. The web page provider module 125 can include the same or a different processor or logic device to provide the web page for display at the user device 115 with the selected thumbnail. In one implementation, the thumbnail selection module 130 generates the thumbnail from the content according to a thumbnail generation criteria. For example, if the content is a video, thumbnail selection module 130 can generate the thumbnail based on thumbnail generation criteria indicating that the thumbnail should be based on at least one image frame of the video. In this example, the thumbnail selection module 130 may generate a thumbnail for every Nth image frame of a video, where N is an integer greater than 1. The thumbnail selection module 130 can also generate, identify, or select a thumbnail based on time. For example, a thumbnail can be generated once per time period, e.g., every Nth second, minute, or hour, where N is a real number greater than zero.

In some implementations, the thumbnail selection module 130 analyzes the video to select image frames used as thumbnails. For example, the thumbnail selection module 130 may employ image recognition techniques to identify faces, people, actions, colors, tones, patterns, or other characteristics to select image frames from the video as thumbnails. In one implementation, the thumbnails may be generated or selected by the thumbnail selection module 130 based on information associated with the user device 115, a user associated with the user device 115, or a person associated with the web page, if the web page is a social networking web page. For example, the thumbnail selection module 130 can select a thumbnail based on information or activity of other users who are a part of the social networking website. This information may be obtained anonymously by the thumbnail selection module 130 so that no users are individually identified, and a user can affirmatively opt-in to allow anonymous collection of their information, or opt-out to prohibit collection of this information. The information may include anonymous demographic information, such as age, gender, marital status, children, income, occupation, geographic location, or language, for example. The information may also include anonymous information about businesses frequented, goods or services purchased, music and video preferences of the user, or purchase history should the user opt to provide this information, for example.

In one implementation, the thumbnail selection module 130 receives at least one thumbnail or instructions to select a thumbnail from the source content provider 120. For example, the source content provider 120 can provide a thumbnail, or indicate a time period or range within the video from which the thumbnail should be selected. The data processing system 110 can provide the thumbnail for display with the web page at the user device 115. For example, the thumbnail selection module 130 may select the thumbnail provided by the source content provider 120 and forward it to the web page provider module 125 for further forwarding to the user device 115. In one example, the data processing system 110 receives instructions from the source content provider 120 indicating a schedule according to which the thumbnails are to be provided to user devices 115. In one implementation, the data processing system 110 obtains instructions from the source content provider 120 indicating which image frames to generate or provide as thumbnails.

The web page provider module 125 can provide a web page for display at the user device 115. The web page can include a link to content using the thumbnail selected by the thumbnail selection module 130. The user device 115 can access the web page containing the link to the content. The data processing system 110 can monitor activity on the web page, such as links being clicked. In one implementation, the quality metric module 135 monitors the activities of the first web page and the second web page and the click-through rates of the first thumbnail and the second thumbnail. For example, the quality metric module 135 can monitor the number of page views of a web page or the number of click-throughs for the link on the web page. In one implementation, the quality metric module 135 determines the number of page views of a web page showing a link to content having a thumbnail or the number of click-throughs for the link. In some implementations, the quality metric module 135 determines the number of unique views or the number of unique viewers. The quality metric module 135 can also determine the number of unique converted views or the number of unique converted viewers.

The data processing system 110 can provide different thumbnails that include links to the same content. The data processing system 110 can evaluate views, impressions, and clicks on the thumbnails (or their corresponding links) to determine the most effective thumbnail (e.g., the thumbnail with the highest click-through rate) from amongst the various thumbnails.

In one implementation, the data processing system 110 provides one thumbnail for display on a web page, and provides a different thumbnail for display on another web page. In this example, a person (e.g. "Roger") can be the named user of his social networking web page. Roger can post a link to video (or other content) on his social networking web page. The link to the video can include or be represented by a thumbnail. The data processing system 110 can provide the thumbnail for display on Roger's web page. Another person ("Serena") can be the named user of her social networking web page. Serena can post, on her social networking web page, a link having a different thumbnail to the same video that Roger posted on his social networking web page. The data processing system can provide the different thumbnail for display on Serena's web page. A third user (e.g., "Rafa") can access Roger's social networking web page from Rafa's user device 115. In this example, Rafa is provided with a first thumbnail on Roger's web page. Rafa can also access Serena's social networking web page from Rafa's user device 115. Rafa is provided with a second thumbnail that is different than the thumbnail provided to Rafa when Rafa accessed Roger's social networking web page. The data processing system 110 can provide the thumbnails for display to a plurality of user devices 115, and identify clicks on the thumbnails or their corresponding links. From this information, the data processing system 110 can determine the click-through rate (or other quality metric) for each of the thumbnails. Based on the click-through rates of the thumbnails, the data processing system 110 can identify the better performing thumbnail (e.g. the thumbnail having a higher click-through rate). This thumbnail can then be selected for future renderings of the link (e.g., on both Roger and Serena's web page). In one implementation, the data processing system 110 pre-populates a thumbnail when the user posts the link to the content on a web page (e.g., at write-time) such that different users who access the user's social network web page view the same thumbnail.

In some implementations, the data processing system 110 provides one thumbnail for display on a web page to some user devices 115, and provides a different thumbnail for display on the same web page to other user devices 115. The different thumbnails in the example indicate the same content. In this example, a person (e.g. "Ray") can be the named user of a social network web page. Ray can post a link to video (or other content) on a web page of the social network. The link to the video can include or be represented by a thumbnail. The data processing system 110 can provide the thumbnail for display on Ray's web page. A second person (e.g. "Kevin") can access Ray's web page from Kevin's user device 115. In this example, Kevin is provided with a first thumbnail on Ray's web page. A third user, (e.g., "Rajon") can also access Ray's web page from Rajon's user device 115. In this example, Rajon is provided with a second thumbnail that is different than the thumbnail provided to Kevin. The data processing system 110 can provide the thumbnails for display to a plurality of users (e.g., including Kevin and Rajon), and identify clicks on the thumbnails or their corresponding links. From this information, the data processing system 110 can determine the click-through rate (or other quality metric) for each of the thumbnails, and based on the click-through rates of the thumbnails, identify the better performing thumbnail (e.g. the thumbnail having a higher click-through rate). This thumbnail can then be selected for future renderings of the link. In one implementation, the data processing system 110 can change the thumbnail corresponding to the link at read time, e.g., each time the web page is rendered to a user who accesses the user's web page.

The data processing system 110 can monitor activity associated with the first thumbnail and the second thumbnail. For example, the data processing system 110 can evaluate views, impressions, and clicks to determine the quality metrics of the first thumbnail and the second thumbnail. The data processing system 110 can compare quality metrics, such as the number of page views or the number of click-throughs, associated with the different thumbnails. The thumbnail with the highest click-through rate can be selected as the thumbnail for future renderings of the link on the social network (or other) web page.

In one implementation, the data processing system 110 includes a key or other identifier with the link when providing the link for display at the user device 115. The identifier can uniquely identify a particular thumbnail. In some implementations, the data processing system uses the identifier to identify thumbnails for the determination of thumbnail quality metrics when content is shared on a social networking website not affiliated with the source content provider 120. For example, a person (e.g., "Phil") can be the named user of a social network web page. Phil can post a link to video (or other content) being hosted at an external website on a web page of the social network. The external website (e.g., a video sharing website) in this example is not part of the social network, and is operated by a separate entity than the entity that operates the social network. The link to the content can have a thumbnail with an associated identifier that allows the external website to track the performance of the thumbnails. The identifiers can uniquely identify a thumbnail and can be used to disambiguate between the thumbnails. In one implementation, the external website allows a user to share the video (or other content) directly from the external website, for example using a share button.

In this example, Phil can share the external website video by posting a link to the video on Phil's social networking web page. The data processing system 110 can post the link together with a particular thumbnail associated with the external website and a unique identifier associated with the thumbnail. In one example, a query-parameter can be appended to all watch page URLs that correspond to a specific video thumbnail being tested. For example, the URL http://samplevideosite.com/watch/1251253?thumb=1212742 can be associated with a link to content that includes a thumbnail identifier. In this example, the identifier is indicated by thumb=1212742. When a user of the social network clicks on the link on Phil's social network web page, the external website can identify which thumbnail was provided to the user based on the identifier, and the data processing system 110 can obtain this information.

Continuing with this example, when a user clicks on the thumbnail of the link to content on a social network web page, the video can open and play, and the data processing system 110 can identify which thumbnail was provided for display to the user when the user clicked on the link. The data processing system 110 can determine the number of views of the web page or click-throughs per thumbnail (e.g., a quality metric) to determine which thumbnail performs more effectively. Once the data processing system selects a thumbnail based on a quality metric, and the data processing system can display the selected thumbnail (e.g., on a social network web page) with links to the corresponding video.

Figure 2:
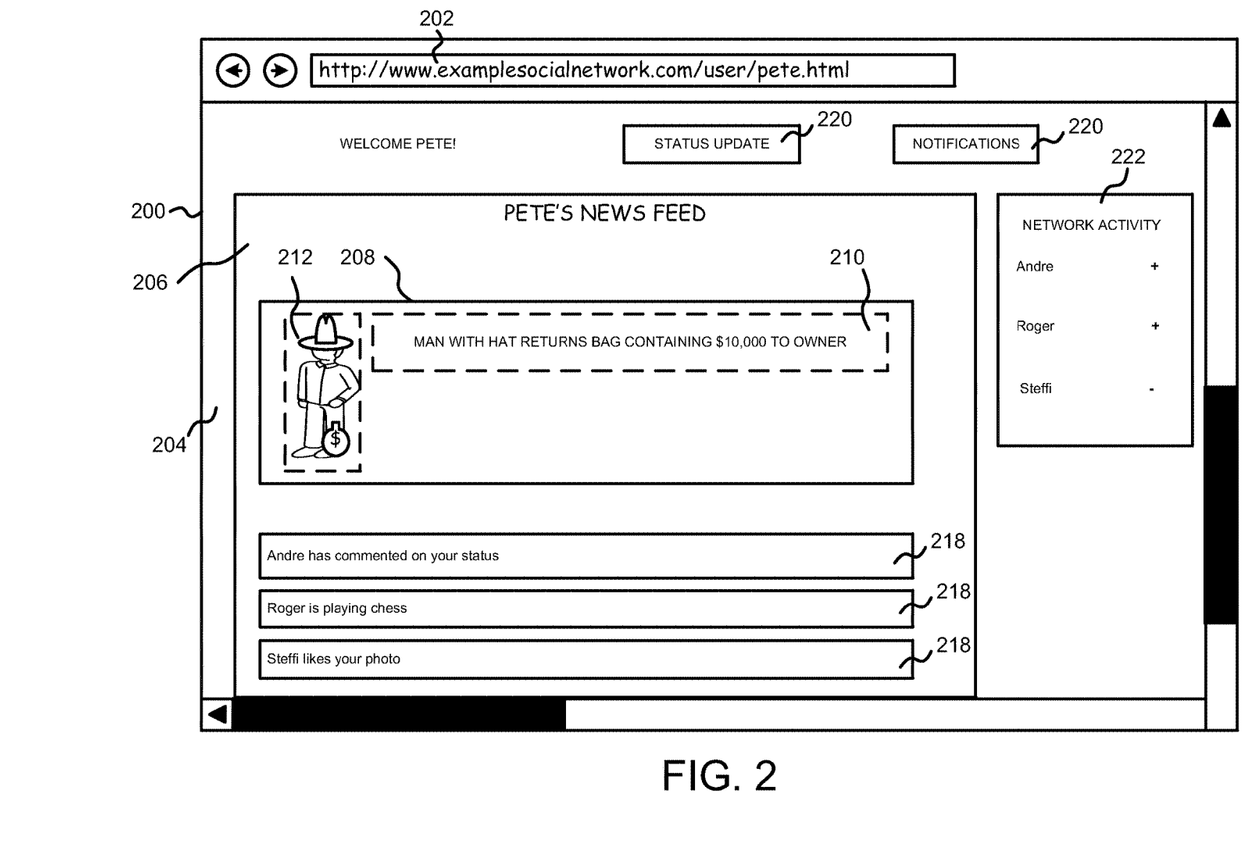
FIG. 2 is a block diagram depicting an example display of a web page having a thumbnail in a computer networked environment, according to an illustrative implementation.

FIG. 2 is a block diagram depicting an example display 200 illustrating a web page 204 having a link graphic 208 in a computer networked environment. In some implementations, the display 200 can provide a web page 204 having a web page address 202 for display at a user device (e.g., the user device 115). The web page 204 can be a web page of a social network. In the example of FIG. 2, the web page 204 is a social network web page of a user "Pete". The web page 204 can include a news feed 206, one or more buttons 220 that can be clicked on to receive information from other web pages associated with the social network, and a network activity field 222 that, for example, provides information associated with users who are in the user's (e.g., Pete's) network.

In some implementations, the news feed 206 or other area of the web page 204 can include one or more links to content. The link can include at least one link graphic 208 or can be provided for display with the web page 204 concurrently with the link graphic 208. For example, the link graphic 208 can be the link to additional content (e.g., a video on another web page), or the link graphic 208 can be presented as a representation of the additional content, with the link to the additional content being provided elsewhere on the web page 204. The link graphic 208 can include a title 210 and a thumbnail image 212. In some implementations, the link may include the entire link graphic 208 so that content represented by the link graphic 208 can be accessed by clicking on the link graphic 208. The link may include any region within the link graphic 208. In some implementations, the link may include a portion of the link graphic 208. For example, the link may include the title 210 and not the thumbnail 212. The news feed 206 can also include one or more updates 218 as well as additional link graphics. These updates can indicate other users' activity on the social network, for example.

Figure 3:
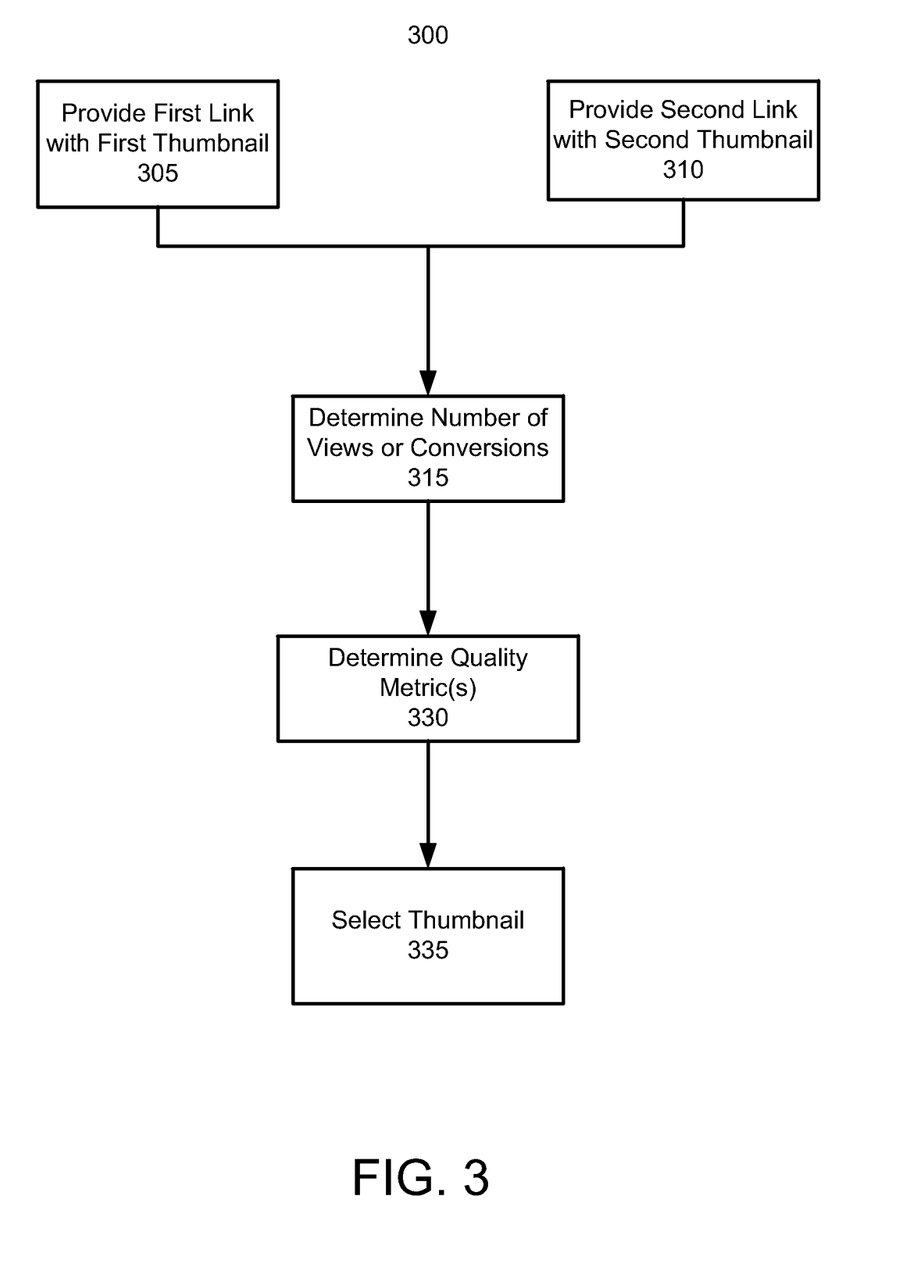
FIG. 3 is a flow diagram depicting a method of evaluating content in a computer networked environment, according to an illustrative implementation.

FIG. 3 illustrates a flow diagram depicting a method 300 of evaluating content in computer networked environment. In one implementation, the method 300 includes an act of providing a first link (BLOCK 305). For example, the data processing system can provide a link to content together with a first thumbnail (BLOCK 305). The content can include a video, and the first thumbnail can include an image frame of the video, for example. The link can be provided (BLOCK 305) by the data processing system for display on a web page of a social network.

The method 300 can also include an act of providing a second link (BLOCK 310). For example, the data processing system can provide a second link to content together with a second thumbnail (BLOCK 310). The second thumbnail can be the same as the first thumbnail or can be a different thumbnail, such as a different frame of the same video. The data processing system can provide a second link (BLOCK 310) to the same content associated with the first link. In some implementations, the first link is provided (BLOCK 305) to a first plurality of user devices requesting access to a first web page, and the second link is provided (BLOCK 310) to a second plurality of user devices requesting access to a second web page. The second web page in this example can have the same or a different web page address than the first web page.

In one implementation, the method 300 can provide at least one of the first link (BLOCK 305) and the second link (BLOCK 310) to at least one identified user device, for example based at least in part on information about the user devices at which the thumbnails are displayed. In some implementations, the first link is provided (BLOCK 305) or the second link is provided (BLOCK 310) to the user device together with an identifier that uniquely identifies the thumbnail. In this example, the performance of a thumbnail associated with the link using the identifier can be determined. In some implementations, when the method 300 provides a first link (BLOCK 305) or provides a second link (BLOCK 310) to content that is shared from the source content provider, the method 300 provides a unique website address as the link to the content for each thumbnail.

The method 300 can include an act of determining a number of views or a number of conversions for links that are provided to user devices (BLOCK 315). For example, the data processing system can identify the number of times a web page containing a thumbnail is rendered for display at a user device or clicked by a user. In some implementations, the number of views or conversions are determined (BLOCK 315) by monitoring an identifier that identifies the thumbnail associated with the link. For example, the data processing system can monitor the number of page views for a particular URL corresponding to the identifier to determine a number of times content was viewed via a particular thumbnail.

The method 300 can include an act of determining at least one quality metric (BLOCK 330) of at least one thumbnail. The determined quality metric can include a click through rate or click through volume. For example, the quality metric of a thumbnail can be determined (BLOCK 330) based on the number of views or clicks of the thumbnail or its corresponding link. In some implementations, the quality metric is determined (BLOCK 330) based on a number of views of the content represented by an identified thumbnail.

The method 300 can include an act of selecting a thumbnail (BLOCK 335). For example, the thumbnail selection module can select a thumbnail having a quality metric above a threshold value or higher than a quality metric of another thumbnail. In one implementation, the method 300 provides links (BLOCK 305 or BLOCK 310) having various thumbnails to user devices and identifies activity associated with the thumbnails (BLOCK 315). The selected thumbnail (BLOCK 335) can generate the most attention for a video (or other content) on various websites, relative to other thumbnails used to represent the video.

Figure 4:
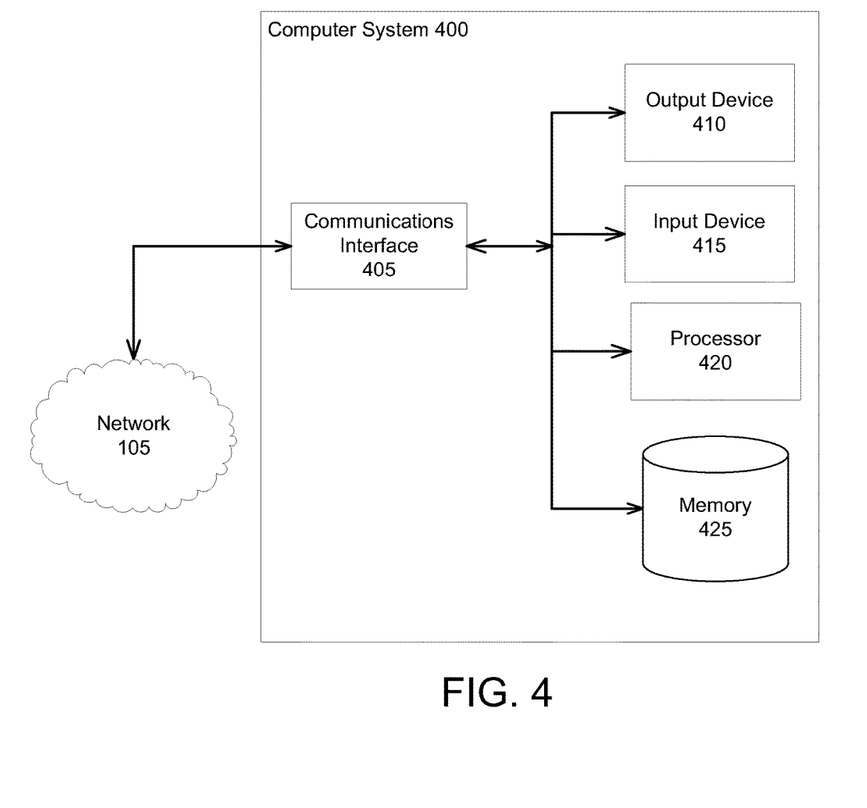
FIG. 4 is a block diagram illustrating a general architecture for a computer system that may be employed to implement various elements of the systems and methods described and illustrated herein, according to an illustrative implementation.

FIG. 4 shows the general architecture of an illustrative computer system 400 that may be employed to implement any of the computer systems discussed herein (including the system 100 and its components such as the web page provider module 125, the thumbnail selection module 140, and the quality metric module 145) in accordance with some embodiments. The computer system 400 can be used to evaluate content in a computer networked environment. The computer system 400 of FIG. 4 comprises one or more processors 420 communicatively coupled to memory 425, one or more communications interfaces 405, and one or more output devices 410 (e.g., one or more display units) and one or more input devices 415. The processors 420 can be included in the data processing system 110, the source content provider 120, the user device 115 or the other components of the system 100 such as the web content provider module 125, the thumbnail selection module 140, and the quality metric module 145.

In the computer system 400 of FIG. 4, the memory 425 may comprise any computer-readable storage media, and may store computer instructions such as processor-executable instructions for implementing the various functionalities described herein for respective systems, as well as any data relating thereto, generated thereby, or received via the communications interface(s) or input device(s). Referring again to the system 100 of FIG. 1, the web content provider module 125, the thumbnail selection module 140, or the quality metric module 145 can include the memory 425 to store the profiles of users, the content, as well as the information used to generate and provide thumbnails and links to the content. The processor(s) 420 shown in FIG. 4 may be used to execute instructions stored in the memory 425 and, in so doing, also may read from or write to the memory various information processed and or generated pursuant to execution of the instructions.

The processor 420 of the computer system 400 shown in FIG. 4 also may be communicatively coupled to or control the communications interface(s) 405 to transmit or receive various information pursuant to execution of instructions. For example, the communications interface(s) 405 may be coupled to a wired or wireless network, bus, or other communication means and may therefore allow the computer system 400 to transmit information to and/or receive information from other devices (e.g., other computer systems). While not shown explicitly in the system of FIG. 1, one or more communications interfaces facilitate information flow between the components of the system 100. In some implementations, the communications interface(s) may be configured (e.g., via various hardware components or software components) to provide a website as an access portal to at least some aspects of the computer system 400. Examples of communications interfaces 405 include user interfaces (e.g., web pages) having links to content with associated thumbnails selected by the data processing system 110 for placement on the web pages to be provided to the user devices 115.

The output devices 410 of the computer system 400 shown in FIG. 4 may be provided, for example, to allow various information to be viewed or otherwise perceived in connection with execution of the instructions. The input device(s) 415 may be provided, for example, to allow a user to make manual adjustments, make selections, enter data or various other information, or interact in any of a variety of manners with the processor during execution of the instructions. Additional information relating to a general computer system architecture that may be employed for various systems discussed herein is provided at the conclusion of this disclosure.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. The program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The features disclosed herein may be implemented on a smart television module (or connected television module, hybrid television module, etc.), which may include a processing circuit configured to integrate internet connectivity with more traditional television programming sources (e.g., received via cable, satellite, over-the-air, or other signals). The smart television module may be physically incorporated into a television set or may include a separate device such as a set-top box, Blu-ray or other digital media player, game console, hotel television system, and other companion device. A smart television module may be configured to allow viewers to search and find videos, movies, photos and other content on the web, on a local cable TV channel, on a satellite TV channel, or stored on a local hard drive. A set-top box (STB) or set-top unit (STU) may include an information appliance device that may contain a tuner and connect to a television set and an external source of signal, turning the signal into content which is then displayed on the television screen or other display device. A smart television module may be configured to provide a home screen or top level screen including icons for a plurality of different applications, such as a web browser and a plurality of streaming media services (e.g., Netflix, Vudu, Hulu, etc.), a connected cable or satellite media source, other web "channels", etc. The smart television module may further be configured to provide an electronic programming guide to the user. A companion application to the smart television module may be operable on a mobile computing device to provide additional information about available programs to a user, to allow the user to control the smart television module, etc. In alternate embodiments, the features may be implemented on a laptop computer or other personal computer, a television with one or more processors embedded therein and/or coupled thereto, a smartphone, other mobile phone, handheld computer, a tablet PC, or other computing device.

The operations described in this specification can be implemented as operations performed by a data processing apparatus on data stored on one or more computer-readable storage devices or received from other sources.

The term "data processing system" or "computing device" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures. The web content provider module 125, the thumbnail selection module 140, and the quality metric module 145 can include or share one or more data processing apparatuses, computing devices, or processors.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), for example. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. In some implementations, the devices suitable for storing computer program instructions and data include a non-transient computer-readable medium, which could include one or more fixed or removable data storage devices, such as a zip drive, floppy disc drive, hard drive, CD-ROM and DVD-ROM disks or drive, tape drive, and the like. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube), plasma, or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system such as system 400 or system 100 can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of the systems and methods described herein. Certain features that are described in this specification in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can in some cases be excised from the combination, and the claimed combination may be directed to a sub combination or variation of a sub combination.

Similarly, while operations are depicted in the drawings in a particular order, this should not be understood as requiring that such operations be performed in the particular order shown or in sequential order, or that all illustrated operations be performed, to achieve desirable results. In some cases, the actions recited in the claims can be performed in a different order and still achieve desirable results. In addition, the processes depicted in the accompanying figures do not necessarily require the particular order shown, or sequential order, to achieve desirable results.

In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products. For example, the web content provider module 125, the thumbnail selection module 140, and the quality metric module 145 can be a single module, a logic device having one or more processing circuits, or part of a search engine. In addition, one or more of the user device 115 and the source content provider 120 can include one or more modules that are configured to perform some or substantially all of the functionality being performed by the data processing system in general, or specifically, the web content provider module 125, the thumbnail selection module 140, the quality metric module 145, or any combination thereof.

In various implementations, the data processing system 110 can utilize the quality metrics associated with each thumbnail and select one of the thumbnails to be associated with the content based on the relative performance of each of the thumbnails. The thumbnail with the greatest click-through rate or the greatest click-through volume may be selected. In another implementation, more than one thumbnail can be selected for use with a link to the content. For example, the data processing system can select a thumbnail to provide to the user device 115 based on characteristics of the user device, the user of the user device 115, or the characteristics of the user sharing the content.

Having now described some illustrative implementations and embodiments, it is apparent that the foregoing is illustrative and not limiting, having been provide for displayed by way of example. In particular, although many of the examples provide for displayed herein involve specific combinations of method acts or system elements, those acts and those elements may be combined in other ways to accomplish the same objectives. Acts, elements and features discussed only in connection with one embodiment are not intended to be excluded from a similar role in other implementations or embodiments.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate embodiments consisting of the items listed thereafter exclusively. In one embodiment, the systems and methods described herein consist of one, each combination of more than one, or all of the described elements, acts, or components.

Any references to embodiments or elements or acts of the systems and methods herein referred to in the singular may also embrace embodiments including a plurality of these elements, and any references in plural to any embodiment or element or act herein may also embrace embodiments including only a single element. References in the singular or plural form are not intended to limit the disclosed systems or methods, their components, acts, or elements to single or plural configurations. References to any act or element being based on any information, act or element may include embodiments where the act or element is based at least in part on any information, act, or element.

Any implementation disclosed herein may be combined with any other implementation or embodiment, and references to "an implementation," "some implementation," "an alternate implementation," "various implementation," "one implementation" or the like are not necessarily mutually exclusive and are intended to indicate that a particular feature, structure, or characteristic described in connection with the embodiment may be included in at least one implementation or embodiment. Such terms as used herein are not necessarily all referring to the same embodiment. Any embodiment may be combined with any other embodiment, inclusively or exclusively, in any manner consistent with the aspects and embodiments disclosed herein.

References to "or" may be construed as inclusive so that any terms described using "or" may indicate any of a single, more than one, and all of the described terms.

Where technical features in the drawings, detailed description or any claim are followed by reference signs, the reference signs have been included for the sole purpose of increasing the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. For example, where links having thumbnails are provided for display on a web page, the thumbnails can be part of the links (e.g., the thumbnail can be clicked to access the underlying content), or the thumbnail can be a separate non-link image that is provided together with a link to the content that is represented by the thumbnail. The foregoing embodiments are illustrative rather than limiting of the described systems and methods. Scope of the systems and methods described herein is thus indicated by the appended claims, rather than the foregoing description, and changes that come within the meaning and range of equivalency of the claims are embraced therein.

What is claimed is:

1. A computer-implemented method comprising:
providing, by a data processing system, a first link to content for display on a first website, the first link having a first thumbnail associated with the content;
providing, by the data processing system, a second link to the content for display on a second website, the second link having a second thumbnail associated with the content, the second thumbnail being different from the first thumbnail;
monitoring at least one of a first number of views and a first number of conversions of the first link and at least one of a second number of views and a second number of conversions of the second link;
determining a quality metric of the first thumbnail based on at least one of the first number of views and the first number of conversions of the first link, and a quality metric of the second thumbnail based on at least one of the second number of views and the second number of conversions of the second link;
selecting, by the data processing system, the first thumbnail based on the quality metric of the first thumbnail being higher than the quality metric of the second thumbnail; and
automatically changing, by the data processing system in response to the selecting, a respective thumbnail of the second link displayed on a respective webpage to the selected first thumbnail for display in connection with a future rendering of the second link on the respective website.

2. The computer-implemented method of claim 1, wherein the first number of views identifies a first number of unique views, and wherein the second number of views identifies a second number of unique views.

3. The computer-implemented method of claim 1, further comprising:
providing the first link for display on a first web page of the first website having a first web address; and
providing the second link for display on a second web page of the second website having a second web address that is different from the first web address.

4. The computer-implemented method of claim 1, further comprising:
providing the first link for display on a first web page of the first website having a first web address; and
providing the second link for display on a second web page of the second website having a second web address that is the same as the first web address.

5. The computer-implemented method of claim 1, wherein the first thumbnail includes a first image and the second thumbnail includes a second image that is different from the first image.

6. The computer-implemented method of claim 1, wherein at least one of the first thumbnail and the second thumbnail comprises an image frame of the content.

7. The computer-implemented method of claim 1, further comprising:
identifying a user device;
determining information associated with the user device; and
selecting, for display at the user device, one of the first thumbnail and the second thumbnail associated with the content based on the information associated with the user device.

8. The computer-implemented method of claim 1, wherein monitoring the at least one of the first number of views and the first number of conversions of the first link comprises monitoring a first identifier with the first link, the first identifier corresponding to the first thumbnail, wherein the first identifier is unique to the first thumbnail; and
wherein monitoring the at least one of the second number of views and the second number of conversions of the second link comprises monitoring a second identifier with the second link, the second identifier corresponding to the second thumbnail, wherein the second identifier is unique to the second thumbnail.

9. A system, comprising:
one or more processors; and
a non-transitory machine-readable medium comprising instructions stored therein, which when executed by the one or more processors, cause the one or more processors to:
provide, by a data processing system, a first link to content for display on a first website, the first link having a first thumbnail associated with the content;
provide, by the data processing system, a second link to the content for display on a second website, the second link having a second thumbnail associated with the content, the second thumbnail being different from the first thumbnail;
monitor at least one of a first number of views and a first number of conversions of the first link and at least one of a second number of views and a second number of conversions of the second link;
determine a quality metric of the first thumbnail based on at least one of the first number of views and the first number of conversions of the first link, and a quality metric of the second thumbnail based on at least one of the second number of views and the second number of conversions of the second link;
select the first thumbnail based on the quality metric of the first thumbnail being higher than the quality metric of the second thumbnail; and
automatically change, in response to selecting the first thumbnail, a respective thumbnail of the second link displayed on a respective webpage to the selected first thumbnail for display in connection with a future rendering of the second link on the respective website.

10. The system of claim 9, wherein the instructions, when executed by the one or more processors, further cause the one or more processors to:
provide the first link for display on a first web page of the first website having a first web address; and
provide the second link for display on a second web page of the second website having a second web address that is different from the first web address.

11. The system of claim 9, wherein the instructions, when executed by the one or more processors, further cause the one or more processors to:
provide the first link for display on a first web page of the first website having a first web address; and
provide the second link for display on a second web page of the second website having a second web address that is the same as the first web address.

12. The system of claim 9, wherein at least one of the first thumbnail and the second thumbnail comprises at least one image associated with the content.

13. The system of claim 9, wherein the first thumbnail includes a first image and the second thumbnail includes a second image that is different from the first image.

14. The system of claim 9, wherein the instructions, when executed by the one or more processors, further cause the one or more processors to:
identify a user device;
determine information associated with the user device; and
select, for display at the user device, one of the first thumbnail and the second thumbnail associated with the content based on the information associated with the user device.

15. The system of claim 9, wherein the instructions to monitor the at least one of the first number of views and the first number of conversions of the first link further cause the one or more processors to monitor an identifier with the first link, wherein the identifier identifies the first thumbnail and is unique to the first thumbnail.

16. A non-transient computer readable storage medium having instructions to evaluate content in a computer networked environment, the instructions, when executed by one or more processors, cause the one or more processors to:
provide, by a data processing system, a first link to content for display on a first website, the first link having a first thumbnail associated with the content;
provide, by the data processing system, a second link to the content for display on a second website, the second link having a second thumbnail associated with the content, the second thumbnail being different from the first thumbnail;
monitor at least one of a first number of views and a first number of conversions of the first link and at least one of a second number of views and a second number of conversions of the second link;
determine a quality metric of the first thumbnail based on at least one of the first number of views and the first number of conversions of the first link, and a quality metric of the second thumbnail based on at least one of the second number of views and the second number of conversions of the second link;
select the first thumbnail based on the quality metric of the first thumbnail being higher than the quality metric of the second thumbnail; and
automatically change, in response to selecting the first thumbnail, a respective thumbnail of the second link displayed on a respective webpage to the selected first thumbnail for display in connection with a future rendering of the second link on the respective website.

17. The computer readable storage medium of claim 16, wherein the instructions, when executed by the one or more processors, further cause the one or more processors to:
provide the first link for display on a first web page of the first website having a first web address; and
provide the second link for display on a second web page of the second website having a second web address that is different from the first web address.

18. The computer readable storage medium of claim 16, wherein the instructions, when executed by the one or more processors, further cause the one or more processors to:

provide the first link for display on a first web page of the first website having a first web address; and provide the second link for display on a second web page of the second website having a second web address that is the same as the first web address.

19. The computer readable storage medium of claim 16, wherein at least one of the first thumbnail and the second thumbnail comprises at least one image associated with the content.

20. The computer readable storage medium of claim 16, further comprising instructions to:

identify a user device;

determine information associated with the user device; and select, for display at the user device, one of the first thumbnail and the second thumbnail associated with the content based on the information associated with the user device.

* * * * *